Patented Dec. 31, 1946

2,413,281

UNITED STATES PATENT OFFICE 2,413,281

SULFUR-TREATED VARNISH BASES

Laszlo Auer, South Orange, N. J.

No Drawing. Application September 21, 1946,
Serial No. 698,421

25 Claims. (Cl. 106—223)

GENERAL FIELD OF THE INVENTION

This invention relates to the production of new and improved products from fatty oils and is especially concerned not only with such products but also with the process of producing the same and further with improved coating compositions incorporating such products. More particularly, the invention is directed to methods by which vulcanized fatty oil products of greatly improved physical properties may be produced for varnish bases (which usually comprise fatty oils or fatty-oil-and-resin mixtures), and to coating materials such as paints, varnishes and lacquers which incorporate such improved fatty oil products. That is, the products of my invention may be used either as a clear finish, or in pigmented form, as a paint or enamel, for example.

Stated in a more specific way, my invention is directed to the production of a partially vulcanized varnish base from any of a number of fatty oils or oil-plus-resin mixtures, in which the disadvantages formerly associated with products of this type are to a large extent eliminated.

For the sake of simplicity, the term, "varnish base," is used herein to identify the materials produced by my process, regardless of whether they are used in paints, varnishes, lacquers, or other surface coating compositions.

Before fully analyzing the nature of the invention, it will be useful to summarize briefly what has been known in the art with respect to these types of coating compositions. In the first place, it has long been known that fatty oils may be vulcanized. This has been accomplished by mixing a relatively large percentage of sulfur with the oil and heating the mixture to an elevated temperature, usually well over 120° C. and frequently as high as 200° C. for a considerable time interval. In the early stages of such treatment the oil is customarily liquid at reaction temperatures, and may continue in the liquid state even after reaction of the sulfur with the oil has progressed to quite an extent. If the heating be terminated during these early stages of vulcanization, the products are liquid at room temperature or are reversibly fusible and thermo-plastic. In addition, the entire mixture is usually soluble in a number of organic solvents. For the purposes of this application the terms "partially vulcanized" or "semi-vulcanized" refer to such products as have this characteristic of being liquid at room temperature or being reversibly fusible, and/or soluble.

If the heating be continued beyond the range of partial vulcanization, substantially complete vulcanization occurs. Under such conditions, a solid mass is formed at the reaction temperature, which is infusible (except upon decomposition) and, as a whole, insoluble in organic solvents. Such products may be regarded as completely vulcanized, even though still further solidification might be produced by other factors, such as continued heating.

Partially vulcanized fatty oils are sometimes referred to in the art as sulfurized oils. When vulcanization is complete, the products are usually referred to as "fully vulcanized" or are known as "factices" or "brown rubber-substitutes" used chiefly in rubber compounding.

Since fully vulcanized oils or factices are insoluble in most organic solvents and are difficult to disperse, they have thus far been little used in protective coatings. The partially vulcanized oils, however, have shown advantageous properties, such as better aging characteristics and improved water resistance in their films, as compared with the films of the same untreated oil. Oils partially vulcanized with sulfur have been observed to yield films which are more elastic and better adapted for numerous industrial uses than those produced without vulcanization.

Certain sulfurized oils, those treated with sulfur chloride particularly, yield coating materials which have the ability to withstand painting "wet-on-wet." This refers to the capacity of such materials to form a smooth adherent first coat which will not "lift" even though subsequent coats be applied before the first has time to dry fully.

Several disadvantages, however, have militated against the use of partially vulcanized oils as ingredients in paints, varnishes, and similar coating compositions. One of the disadvantages observed in connection with the partially vulcanized oils as heretofore used has been their very dark color. This factor, attributed to the effect of the sulfur on the oils, has rendered them unsuitable for use in clear varnishes, and has also greatly curtailed their use even in pigmented coating materials.

Another disadvantage lies in the fact that the initial drying time is relatively long, and an "after-tack" may be observed many hours after the film has been applied. Apparently, it is necessary for the oxygen of the air to act on a paint in order to secure satisfactory film formation from drying oils, and it has been supposed that what has retarded this action in the partially vulcanized compounds is the sulfur present in them, since sulfur is an anti-oxidant.

A third disadvantage which has seriously interfered with the acceptability of partially vulcanized oils as paint and varnish bases pertains to the interaction which results when such oils are utilized in association with metallic pigments or metal-containing driers. The sulfur remaining in the partially vulcanized oil reacts with metallic components known to form black sulfides, causing discoloration of the film.

As mentioned above, oils vulcanized with sulfur chloride were known in the art as paint raw materials, and as having a lighter color than the oils vulcanized with sulfur alone. However, a very serious defect inherent in compounds made by treating oils with sulfur chloride is the tendency of such compounds gradually to release hydrochloric acid. The films made from such materials have very poor aging qualities, probably due to the hydrochloric acid, and the materials themselves cannot be used in association with metal-containing driers and pigments without jeopardizing the quality of the composition.

Various of the foregoing difficulties of prior practice are eliminated or at least greatly reduced by the present invention. I have discovered that if the fatty oils to be vulcanized are first considerably bodied, vulcanization may be effected with surprisingly small quantities of sulfur, thereby providing distinctive advantages mentioned below.

The products of this invention are notably light in color, and films formed from them are resistant to darkening. These characteristics are not adversely affected by conjoint use with metallic pigments or with metal-containing driers. The products when made from drying oils, give fast-setting and fast-drying films, especially if used with conventional driers. Products made from semi-drying and non-drying oils naturally have reduced drying power, as compared with products made from drying oils. In the event of use of semi-drying and non-drying oil products prepared in accordance with this invention in making coating compositions, it may be desirable either to use increased percentages of driers or to employ baking for drying purposes. In fact, products made from semi-drying and non-drying oils yield highly effective coating materials for baking processes. Still further, products made with semi-drying and non-drying oils may be of advantage in the preparation of pressure sensitive adhesive coatings, particularly where no driers are present, and in this connection it may be mentioned that even products made from drying oils may be useful for certain adhesive purposes, although in this event driers should be omitted.

Where surface-protective films are produced as indicated, they uniformly possess good aging properties and good elasticity, and it is possible to apply these materials wet-on-wet without "lifting" of the earlier coat. Still further, such coating compositions are of very good color, as compared with other vulcanized oil coatings. In short, the advantages flowing from the vulcanizing process are present in the products of my invention, while the disadvantages have been greatly reduced if not eliminated entirely.

The process of this invention results in producing, at low cost and by methods little subject to error, varnish bases, paints, and the like, from vulcanized oils; that is, from oils which have been vulcanized, but not so completely as to have become entirely insoluble or to have lost beyond recapture the characteristic of being reversibly fusible, as is more fully discussed hereinafter.

THE PROCESS OF THIS INVENTION

As the first essential of my process, I propose to body the fatty oils to be treated, preferably to such an extent as to greatly modify their consistency. This bodying step may be performed in any of a number of ways, to be more fully discussed hereinafter. The importance of bodying the oil becomes apparent in considering its effect upon the sulfur treatment, which follows:

The second step is the addition of a small amount of sulfur to the bodied oil. This is preferably accomplished while the heavily-bodied oil is at a temperature not over 200° C.

I have discovered that a most unexpected result flows from using a heavily-bodied oil, namely, that the desirable properties of the sulfurized products heretofore known can be produced by treating such oils with very small amounts of sulfur. Indeed, when such heavily-bodied oils are used, much less sulfur is needed, and products of greatly improved physical properties are produced. Moreover, apparently because the sulfur content of the treated product is so greatly reduced, the objectionable characteristics of former sulfurized oils are almost entirely lacking. Furthermore, vulcanization occurs at a more rapid rate, in proportion to the amount of sulfur used, if heavily bodied oils are employed. Still further, it is possible to secure vulcanization quickly at a temperature not exceeding 200° C. The importance of this point becomes apparent when it is realized that previously a fatty oil, such as linseed oil, at 160° C., required as much as 15% to 20% of sulfur and treatment for several hours to produce vulcanization. With a heavily heat bodied oil such as I propose to employ, vulcanization can be obtained, for instance, by treatment at the same temperature, but with less than 2% of sulfur and for only 15 to 30 minutes.

It should here be noted that I have used the term "vulcanized" in many instances in describing the extent of reaction. This is because the state of complete vulcanization or gelation marks a critical point, upon which valid comparisons may be based. The preferred process of my invention contemplates that the vulcanization process shall be arrested before it becomes complete, but the ideal time to do this is just before complete vulcanization occurs. Consequently, the point of complete gelation is used as a point of reference. It may also be noted that even after gelation begins, it is sometimes possible to reestablish the characteristics of partially vulcanized products, and my process does contemplate the use even of gelled oils, provided the desired properties are still capable of being recaptured by appropriate treatment, such as is described hereinafter.

Indeed, the improvement in properties exhibited by these low-sulfur-content oils is striking. The color of the product has hardly changed from the color of the starting oil. The air drying properties of the films are much better than those of other vulcanized oils and, beyond this, the addition of metallic driers or metallic pigments produces little, if any, sulfide formation, with its attendant darkening of the film.

Following the sulfur treatment, the varnish base is cooked for as long a time as is necessary and usually is then thinned by the addition of suitable solvents. Ordinarily, pigmentation is then effected, if desired, by milling. It is possible to apply the sulfur treatment of my invention to pigmented oils and varnishes, but it is preferable to attend to pigmentation after the varnish base has been vulcanized and cooked.

Heretofore, varnish bases used in the manufacture of paints have customarily been "cooked" at relatively high temperatures, well over 200° C. It has been necessary to operate at such temperatures to obtain satisfactory qualities. By contrast, the improved products of this invention require relatively little cooking, and this can be done at relatively low temperatures. A notable advantage flows from this characteristic. Since it is possible to operate at temperatures not substantially exceeding 200° C., it is also possible to add the customary thinners directly to the kettle as soon as the cooking has been completed. These thinners (for instance, mineral spirits) have a comparatively low boiling point and flash point, and it has heretofore been extremely hazardous to add them to the varnish base because of the temperatures usually employed for regular varnish cooking. A waiting period has been necessary, until the varnish base has cooled below about 200° C. In the present process, such a waiting period is not necessary.

To amplify this point: Varnish bases must be cooked, often at temperatures around 300° C. (572° F.) because they will not otherwise attain the desired qualities, such as viscosity, clarity, etc. Then, when the cook has advanced to a satisfactory degree, heating is stopped. But the residual heat in the mass is so great at that stage that bodying will continue for a time after the heat is cut off. The result is what is known as after-bodying, and if the time to stop cooking has been miscalculated, after-bodying may proceed to a point where the mass will gel completely before it has sufficiently cooled to permit stopping the reaction entirely by adding thinner. This is because the thinner cannot safely be added until the mass is below about 200° C. Frequently, it is customary to check the bodying just short of the gelation point by "chilling back"—which is the addition of a quantity of cold oil to produce a quick drop in the temperature. The addition of this quantity of oil is a matter requiring the greatest skill and precision, for it inevitably produces substantial changes in the viscosity of the batch. The problem is further complicated by the increase in viscosity which always occurs as the varnish cools. Obviously, it requires most careful handling to add just enough oil at just the right time to secure the specified terminal viscosity of the product after cooling. A further disadvantage is that the chill-back oil is not properly cooked-in with the varnish.

Since the cooking time necessary is greatly reduced by my invention, and since the desired qualities can be produced by cooking for so short a time at temperatures of as little as 150° C., the process which I propose is very much less expensive in terms of heat required. But much more important are the advantages obtained from a physical point of view, for the fact that high temperature cooking is not needed makes it possible to stop the cooking exactly at the proper point by adding thinner directly to the kettle. Thus, after-bodying is entirely avoided, and it is never necessary to upset the viscosity calculations by chilling back. Consequently it is a relatively simple matter, when proceeding according to my process, to work to very close limits as to viscosity, thereby obtaining with greater precision the desired body in the finished product.

Because the varnish cooking can be completed so quickly, and uses so little heat, my invention makes possible the treatment of greatly increased quantities of material without increasing the amount of equipment required. Thus, production may be increased without added capital expense, and with a most notable improvement in the quality of the products.

In short, the advantages inherent in the products of my invention and in the process of producing these products are of the greatest importance in the paint and varnish industry. The varnish bases are uniquely useful in the coating arts, both as components of paints, varnishes and lacquers, and as varnishes, per se. They can be diluted as desired, may be used with metallic driers, and may be employed either in dispersions in organic solvents or in the form of emulsions, such as aqueous emulsions.

Moreover, by appropriate selection of materials and conditions, for instance employment of a non-drying oil in the absence of driers, pressure sensitive adhesives which preserve their tacky quality for long periods can be prepared.

THE STARTING MATERIAL

The process may be applied to fatty oils generally, including drying oils, semi-drying oils, and non-drying oils. A typical list of such oils follows:

Tung oil
Oiticica oil
Dehydrated castor oil
Linseed oil
Perilla oil
Sunflower oil
Poppyseed oil
Soyabean oil
Walnut oil
Rapeseed oil
Pineseed oil
Olive oil
Corn oil
Cottonseed oil
Coconut oil
Babassu oil
Hydroxylated oils such as castor oil, etc.
Fish oils (train oils)

It should be noted that, in addition to the natural glycerin esters of the fatty acids, other esters may be employed, such as synthetic glycerin esters of fatty acids, and fatty acid esters formed with other polyhydric alcohols, such as glycols, pentaerythritol, mannitol, sorbitol, etc.

In short, natural or synthetic oils may be used, whether of animal or vegetable origin, as well as fractions of either type. And appropriate mixtures or combinations of members of these classes may be treated, as desired. For convenience, all such materials and combinations are referred to herein merely as fatty oils.

TREATMENT CONDITIONS

Bodying

The first step in my process is, as indicated above, the bodying of the oil. This is effected in any of several known ways, such as:

1. By heating the oil, at suitable bodying temperatures, above 200° C. and usually above 250° C., until the desired viscosity is attained. (Stand oils, polymerized oils, or heat bodied oils.)

2. By blowing air, oxygen or ozone over or through the oil to be thickened, either at room temperatures or at elevated temperatures. (Oxidized oils or air blown oils.)

3. By utilizing various gases, such as $SO_2$, $H_2S$, $CO_2$, $N_2$, etc. either to blanket the oils during heat treatment or to treat the oils directly by blowing or bubbling the gas through the oil, either with or without the use of heat. (Non-oxidized bodied oils.)

4. By treating the oil with ultra-violet rays. (Uviol oils.)

5. By treating the oil in an electrical circuit with a potential difference capable of yielding bodying. (Voltol oils.)

6. By bodying oils with modifying agents (polar compounds) as disclosed in my U. S. Patents Nos. 2,189,772, 2,213,944, 2,293,038, 2,298,270, 2,298,916, etc., and the various divisions and continuations thereof. For the purposes of the instant process, I use only such modifying agents disclosed in my earlier patents, which do not form soaps during the heat bodying reaction and which do not belong to the class of soaps themselves.

7. By heat-bodying under vacuum, occasionally coupled with a steam treatment to distill off free fatty acids.

Combinations of certain of these bodying techniques may be employed, as, for example, bodying with polar compounds in the presence of an electrostatic field.

If the bodying step performed is one which involves heating the oil, it is advantageous to utilize the bodied oil while still hot in performing the second step.

It is important to the attainment of best results that the oil should be bodied before treating it with a low percentage of sulfur in accordance with my invention. Even where the bodying is relatively slight some advantages may be realized, but the strikingly improved results of my preferred method are most readily produced if the oil is quite heavily bodied. The extent or degree of bodying may vary over a considerable range, depending upon the purposes in view. However, in the preferred practice of the invention, the range of bodying desirable before vulcanization may be defined by limits, as follows:

In the first place, the oil should be bodied at least to a degree such that when heated to 160° C. with 4½% sulfur an irreversible gel will form within about 4 hours and most desirably within about 3 hours.

On the other hand, the oil preferably should not have a body heavier than that which would result in conversion to an irreversible gel in less than 15 minutes when vulcanized with ½% sulfur at 120° C.

It may be mentioned that these limits, as just defined, are applicable not only to sulfur treatment of fatty oils themselves but also to sulfur treatment of fatty oils in admixture with resins, thereby yielding vulcanized varnish bases of the oleo-resinous type.

I prefer to define the desired viscosity as above described, because, in the light of present knowledge, it is easier to apply some such test than it is to separate the component parts of an oleo-resinous mixture in order to determine the viscosity of the oil alone.

In addition to the foregoing limits of the range of bodying, it may be mentioned that alternatively the preferable range of bodying of the oil may be expressed by any suitable viscosity scale. Thus, the satisfactory range of bodying is from about 15 to 20 poises (Y on the Gardner scale) up to in the neighborhood of 800 poises (beyond the upper limit of the Gardner scale). For most purposes it will be found desirable to utilize a viscosity upwards of about 100 poises. The measurement of the desired body by viscosity scales will, of course, be best suited to the situation where the oil is bodied prior to admixture with a resin, as in the preparation of varnish bases.

The best viscosity for any particular oil or oleo-resinous mixture will be a function of several variables. To mention a few, the quantity of sulfur used, the temperature of treatment, the type of resin used, if any, the nature of the oil, the effect desired, etc. will influence the degree of body to be employed. In each individual case, however, it is easy to determine the most favorable viscosity to use. After the proper viscosity has been determined, the desired conditions can readily be duplicated. For instance, one may simply note the appearance and the behavior of so much of the material as clings to the stirring paddle when it is lifted out of the kettle from time to time, such as flow and the lengths of the string formed, etc.

It should be remembered, of course, that different resins have diverse effects on the oil bodying. Allowances must be made for this fact in calculating the time necessary to attain proper bodying of a particular mixture, and it should also be realized that in a certain case it may be possible to proceed to the sulfur treatment step before the viscosity of the mixture is as high as would be necessary in another case with a different oleo-resinous mix.

All of the heat bodied oils useful in this process are freely flowing at room temperature, however slow their flow may be. Further, these heat bodied oils are free of soaps. If the heat bodying is carried out in the presence of soaps, or when soaps are formed during the heat bodying process, the resulting oils are solid at room temperature, in view of the fact that the soap forms the outside phase of the mixture and the oil is so to say dispersed in the soap. Such oils, which are heat bodied and contain soaps, will vulcanize easier and with lower sulphur content, than the soap-free heat bodied oils of this process. However, the soap containing oils will always show great sensitivity to water and in many instances such soap containing oils are self emulsifying, i. e. they will form emulsions by simply mixing with water, without the addition of other agents. This affinity of the soaps to water causes undesirable properties in films formed by coating materials comprising such soap-containing oils. The coatings so formed have greatly reduced water resistance, weather resistance, and washing resistance properties. On the other hand the vulcanized heat bodied soap-free oils of this process have good resistance to water and films containing such oils show good water resistance, good weather resistance and good resistance to washing.

*Temperature ranges*

If the bodying step is carried out at a temperature below 200° C., it is possible to add sulfur to the material directly. But when heat-bodying in the conventional temperature ranges (say 300° C.) is employed, the oil should be cooled to vulcanizing temperatures before the sulfur is added.

The temperature at which the sulfur treatment is carried out should ont exceed about 200° C. A desirable range is between this point and about 120° C. The upper limit is important, not only because of the desirability of keeping the temperature low from the standpoint of control of viscosity, etc., but also because at temperatures substantially above 200° C., the character of the reaction produced is fundamentally different.

Within this temperature range I have found that usually the best results are secured in a narrower band—between about 140° C. and 180° C. An average temperature of 160° C. has proved highly satisfactory. In the presence of suitable accelerators, however, the reaction temperature may be substantially reduced, sometimes even below 120° C.

Varnish bases may be produced in different ways, as is known in the art, with respect to the mixing of the oil and resin components. The oil may be separately heated and then mixed with the resin and cooked; or the oil and resin may be mixed and cooked together; or the resin may be preheated before the oil is added.

The addition of the sulfur may take place at any one of several points in the preparation of an oleo-resinous varnish base or in increments at more than one point. Thus, it is possible to add the sulfur after bodying the oil but before adding the resin, and then continue cooking to establish the desired viscosity. It is equally possible to add the sulfur to a mixture of bodied oil and resin, and vulcanize and cook simultaneously. Or the resin and oil may be vulcanized at one temperature and further cooked at another temperature. Further, the resin may first be melted, followed by the addition of a sulfur-containing oil, and cooking continued.

Other variations such as cold-cutting of low-sulfur content oils, and other procedures will be obvious to those skilled in the art.

The primary reason for variations of this type lies in the matter of compatibility. Not all resins and oils are compatible without special treatment. For example, it may be necessary to heat a particular resin with a certain portion of an oil to a relatively high temperature—possibly 300° C.—to produce compatibility with that particular oil. Regardless of the temperatures at which the oil or the resin may have been treated prior to the addition of the sulfur, it is important that the vulcanizing step should be carried out at a temperature not substantially exceeding 200° C. Consequently, in cases where the oil and/or resin must be heated at high tempertaures before they become compatible, it is necessary to wait until the temperature of the mass has cooled to a point below 200° C. before the sulfur is added. It is, of course, possible to hasten the cooling in any of several ways.

The factors which will influence the temperature to some extent are primarily (a) variations in the amount of sulfur employed (b) variations in the nature of the oils or oleo-resinous bases and (c) variations in the final characteristics, such as viscosity, desired. The purpose in cooking is primarily to establish the desired viscosity and this will require different treatment times and temperatures depending on the nature of the materials involved. In general, with a given oil increasing the time and the temperature will accelerate the reaction. Shortening the time and decreasing the temperature will retard the reaction. Increasing the amount of sulfur used will shorten the time at a given temperature or permit a reduction in temperature for the same unit of time. Obviously the quality of the end product may vary somewhat depending on which combination of such factors is chosen.

*Percentage of sulfur*

In line with the comments in the preceding paragraph it will be understood that the amount of sulfur added may be varied depending on the type of product desired, the temperature and time of treatment, the nature of the oil or oleoresinous mixture and the viscosity of the oil. However, I have found that very small quantities of sulfur are sufficient where the oil has been heavily bodied—as little as 1% or 0.5%, and sometimes even less, being enough in certain cases. At the other extreme I have found that as much as about 9 or 9.5% can be used if suitable precautions are taken to prevent the vulcanizing process from proceeding to too great an extent. However, products obtained in operating towards the upper portion of this percentage range begin to manifest some of the disadvantages characteristic of the prior art, and for this reason I prefer to avoid the use of more than about 4 or 4.5% of sulfur. Below this amount, I have obtained very satisfactory results with the addition of sulfur in proportions of about 1½%, calculated in relation to the oil used. These highly satisfactory results may be obtained in somewhat shorter time by increasing the sulfur content, for instance to 3%.

As indicated above, increasing the sulfur content results in shortening the time and/or lowering the temperature of treatment. On the other hand, the amount of sulfur used should be kept low because an increase in the amount of sulfur results in darkening of the varnish and impairment of the qualities of the film in the matter of drying time, etc. Accordingly, I have determined that the most advantageous range of sulfur addition, considering the variables involved, is between 1% and 3%.

Sulfur may be added to the oil in elemental form such as flowers of sulfur. It is also possible to vulcanize by the aid of sulfur-containing vulcanizing agents. Moreover, compounds may be used which will produce sulfur in situ—for instance a combination of H₂S and SO₂ gases will form sulfur in situ if added to the oil in proper proportions, according to the reaction:

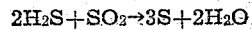

$$2H_2S + SO_2 \rightarrow 3S + 2H_2O$$

*Supplemental treatments*

Of course, many variations will occur to those skilled in the art, and many special techniques will suggest themselves. Many of the conventional "tricks" of the varnish industry can be profitably utilized in carrying out my process.

I may also mention the use of accelerators in conjunction with the sulfurizing treatment described. I have found that certain particular accelerators and certain other agents give quite good results, although certain others have an adverse secondary effect of retarding the drying. One of the best accelerators for the present purposes is di-ortho-tolyl guanidine (DOTG). With it I have secured excellent coatings for normal air-drying at room temperature. The effect of retarding drying which marked some other agents would not prevent their use at least in some instances, especially where the coating is to be baked on.

When DOTG is employed, its action may be still further improved by using with it a small amount of zinc oxide. A satisfactory proportion is the addition of 0.5% of each. Incidentally, coatings containing an accelerator and/or zinc oxide uniformly showed excellent baking characteristics, being fast baking even at relatively low baking temperatures. It is, of course, apparent that less sulfur may be used where accelerators are also employed. Their use further makes it possible to carry on the vulcanizing step at somewhat lower temperatures.

As noted above, the addition of DOTG and zinc oxide yields a product whose films have enhanced drying properties. The best results, however, come from a combination of accelerator, zinc oxide, and drier.

A rather surprising discovery is the enhancement of drying properties obtained by using zinc oxide and drier without the accelerator. This produces a film the quality of which is better than any other except that resulting from the conjoint use of drier, accelerator, and zinc oxide.

Another aspect of my invention of considerable importance is the possibility of employing the varnish bases produced as described above, in the form of emulsions. Emulsions of the water-in-oil type or emulsions of the oil-in-water type may readily be prepared. This latter type of emulsion is becoming increasingly important commercially as applied to the production of coating materials of the type known as cold water paints, and I have found that paint emulsions of exceptional properties may be secured by employing vulcanized oils prepared in accordance with this invention.

For instance, such emulsions demulsify very quickly when used as coating materials, whether they be of the oil-in-water type or the water-in-oil type. Emulsions of both types, made from the materials of the present process, tend to remain on the surface of porous materials, with very little penetration. The water-in-oil type emulsions using low-sulfur content oils are distinguished by good adhesion and wetting-out properties not only when applied to porous surfaces such as wood, cement, etc. but even when applied to non-porous surfaces such as glass and metals. This property is valuable and distinctive. It has proved extremely difficult to make emulsion paints heretofore which would wet-out glass and metals and which could be used as primer coats on non-porous surfaces. It is possible to formulate aqueous emulsion coating materials using low-sulfur containing oils and resins in such a way as to produce glossy films. This is another distinctive and valuable property since it has heretofore been extremely difficult to produce glossy films from aqueous emulsions.

Although any of various known emulsifying methods may be adopted in producing emulsions, I have had marked success when incorporating methyl cellulose therein. A full disclosure of that emulsifying technique will be found in copending applications 467,904, filed December 4, 1942, now Patent 2,382,532 and 469,210, filed December 16, 1942, now Patent 2,372,756. It should be noted that, in the production of the oil-in-water type of emulsion, some agent in addition to the methyl cellulose is desirable. In the examples appended to this specification, I have described the preparation of this type of emulsion using sodium hydroxide in one instance and sodium stearate in another. A suitable technique for emulsifying the materials produced by the present process will be quite obvious upon reference to the copending applications referred to, and for that reason the methods available are not considered in greater detail herein.

EXAMPLES

To illustrate the significance of the foregoing disclosure, the following examples are submitted, demonstrating various features of my process.

In all of the following examples, the percentages are based on the oil content, regardless of whether or not resin is present or whether or not the resin portion may be conjointly affected by the sulfur. All temperature readings are according to the centigrade scale.

SET A

Effect of bodying techniques

Three oils, each having a viscosity of about 800 poises, were treated according to the invention and compared. These oils were:

I. M-37, a commercially available linseed oil, made by heat-bodying under vacuum, and steam treated, having an acid number of 2.9.

II. An alkali refined linseed oil, bodied by bubbling $SO_2$ gas through it at 300° C. for 5 hours, at 100 mm. mercury pressure, the rate of treatment being 40 gm. of gas per hour to 8000 gm. of oil. Acid number 6.4.

III. The same as II but without the $SO_2$ treatment, and heated for 11½ hours to produce the viscosity stated. Acid number 23.9.

In making these comparisons, the gelation point was determined by a procedure similar to the Browne test for determining the gelation point of China-wood oil. Several test tubes are loosely supported in a float, which rests upon a bath of hot liquid. The lower ends of the test tubes reach through the float into the bath. Each tube is half-filled with a sample of oil to be tested. A thermometer is placed in each tube. So long as the thermometer can be freely lifted from the oil, gelation has not occurred. But when the oil has gelled to such a degree that raising the thermometer results in also raising the oil with the test tube, gelation has occurred.

A 300 gram batch of each of the oils mentioned above was heated to 140° C., and then 1½% of sulfur (4½ gm.) was added to each. When the sulfur had completely dissolved, a small quantity of each batch was transferred to a test tube to determine gelation time, the results being shown below in Table 1, under Test 1.

The test tube samples of this demonstration (Test 1) were immersed in a glycerine bath at 180° C., to provide a temperature within the tubes of 160° C.

After removing the samples for Test 1 at 140° C., the batches of oil were heated to 160° C. and held at that temperature for about 15 minutes. Thereafter each batch was diluted to 55% solids, and the viscosity determined (Test 2). The dilution was accomplished at the end of the time stated, by adding mineral spirits. Because of the low cooking temperature, the mineral spirits could be added directly to the oil, and this quickly stopped the action of the sulfur, by cooling the mixture below vulcanization temperature.

After this treatment, the materials were thinned in each instance to 50% solids, with mineral spirits, and viscosity determinations were made.

*Part 3.*—A third part of each portion (taken before adding sulfur) was then tested as a control—that is, cooked with the same ester gum in the same proportions as in Part 2, but without the addition of any sulfur. Comparative results are shown in the table just below.

TABLE 2

| Oil used | Viscosity before adding sulfur | | Oil, alone (part 1), time to produce a gel @ 160° C. after adding sulfur | Oil plus ester gum | | |
|---|---|---|---|---|---|---|
| | | | | Part 2, after adding S | | Part 3, (no sulfur) viscosity [2] after 25 minutes |
| | Poises | Gardner | | Treatment time, minutes | Final viscosity [2] | |
| IIa-B-1 | 17 | Y | Did not gel 16½ hours | 25 | A− | A− |
| IIa-B-2 | 46 | Z-2 | 3 hr. 40 min | 25 | A | A− |
| IIa-B-3 | 100 | Z-6 | 2 hr. 24 min | 25 | A+ | A− |
| IIa-B-4 | 800 | Heavy | 15 min | 24 | H | E |
| I | 800 | ...do... | ...do.[1] | 20 | U | H |
| III | 800 | ...do... | 13 min.[1] | 20 | M | G |

All cooks made at 160° C., and sulfur, when added, being in proportions of 1½% based on the quantity of oil present.
[1] These two values, taken from Table 1, are inserted here for convenient comparison. Samples of these oils were mixed with ester gum as above for comparative purposes.
[2] Gardner scale, after dilution to 50% solids.

TABLE 1

| Oils | Test 1, gelation time at 160° C. | Test 2 | |
|---|---|---|---|
| | | Time at 160° C. | Viscosity (Gardner scale) at 55% solids |
| | Minutes | Minutes | |
| I | 15 | 13 | Gelled before dilution. |
| II | 15 | 15 | X-W. |
| III | 13 | 15 | W. |

The above table indicates that at a viscosity of 800 poises, treatment with 1½% sulfur produces rapid gelation or heavy body even at comparatively low temperatures and in a very short time, regardless of the method used to attain the heavy body initially. The $SO_2$ oil (II) is particularly desirable, since it shows little tendency toward premature gelation.

SET B

*Variations in initial body of the oil*

The examples given below illustrate the effects of treating a given oil bodied to varying degrees of viscosity. An alkali-refined linseed oil, such as used in preparing No. II in the previous demonstrative set, was bodied by a similar treatment, using, however, only 20 gms. per hour of $SO_2$ to 8000 grams of oil. This oil will be referred to as II-*a* hereafter. As the viscosity increased, portions were withdrawn at various intervals, and the portion remaining was bodied to about 800 poises. These samples are designated IIa-B-1, IIa-B-2, IIa-B-3, and IIa-B-4 hereafter.

*Part 1.*—A portion of each sample was treated with 1½% of sulfur at 160° C., and the gelation time noted for each.

*Part 2.*—Other parts of each portion (taken before adding sulfur) were mixed with ester gum, to make an approximately 25 gallon long varnish base; that is, in proportions of 200 grams of oil to 100 grams of ester gum. The mixture was heated to 140° C. and 3 grams of sulfur (viz. 1½% calculated with relation to the oil) were added. After the sulfur dissolved, the temperature was raised to 160° C. and held there for 25 minutes unless gelation seemed imminent sooner.

Observations: The increase in viscosity of a varnish base cooked with 1½% of sulfur at 160° C. occurs in a very short time if the oil used has been heavily bodied. When the oil has not been bodied above a viscosity of 100 poises, longer cooking is required to develop a satisfactory final viscosity. In these examples, the improvement in bodying of the bases made from the lower viscosity oils was only beginning to become apparent at the end of twenty-five minutes.

It will also be noted that the heavily bodied oils IIa-B-4, I and III vulcanized more rapidly when treated alone (Part 1) than when admixed with the ester gum base (Part 2). The presence of the resin seems to slow down bodying. Comparing Tables 1 and 2 will show that heavy oils have a somewhat higher viscosity after 15 minutes of treatment without resins than they attain when treated in admixture with ester gum, even for slightly longer intervals. Whereas oils I, II and III, when vulcanized by themselves, as in Set A, behaved in a very similar way, it will be seen that in admixture with a resin, as in Part 2 of Set B, they reveal distinct differences in behavior.

SET C

*Effect of varying amount of sulfur*

In Table 3 below, are compared the results of cooking three varnish bases, each containing a different oil, but of similar viscosity, with 1½% of sulfur (column 1) and with 2¼% of sulfur (column 2). In addition, in column 3 is shown the results of cooking at a lower temperature than in column 2, but with the same amount of sulfur as in column 2. The oils used were all linseed oils. The first, Admolene (Archer-Daniels-Midland Co.) was bodied to a viscosity of about 350 poises; the second, also a product of Archer-Daniels-Midland, known as M-17, to a viscosity of about 420 poises; the third, an $SO_2$ oil of type II was bodied to a viscosity of 500 poises. For practical purposes these viscosities may be regarded as being almost the same. Each of these oils was mixed with ester gum to produce a varnish base of approximately 25 gallon length which was cooked for 10 minutes.

TABLE 3

*Gardner viscosity (at 50% solids) after cooking for ten minutes*

| Oil used | Column 1 160° C.—1½% S | Column 2 160° C.—2¼% S | Column 3 150° C.—2¼% S |
|---|---|---|---|
| Admolene | G | K | E— |
| M-17 | E | G | C— |
| SO₂—type II | E | G | D |

It will be seen that, in a given time, an increase in the amount of sulfur produces a greater viscosity, the temperatures being the same; and that, the amount of sulfur being the same, a temperature of 160° C. produces a greater viscosity than one of 150° C. It will also be noted that a temperature of 160° C. yields better results in the time stated, with only 1½% of sulfur than are obtained in the same time interval at 150° C., with 50% more sulfur, that is, with 2¼%.

In Table 3a, below, are shown the results of cooking with varying amounts of sulfur, three batches of the same varnish base material, the cooking in this instance having been continued until a satisfactory viscosity was attained, instead of being arbitrarily terminated at the end of a given time, as in Table 3. The viscosity of the oil used in each batch was from Z-3 to Z-4 (considerably lower than the viscosities of the oils used in Table 3, above). The varnish bases were of approximately 25 gallon length, and the resin constituent was Paranol 1750, a rosin-modified phenolic resin, which was mixed with the oil and heated to 300° C. in each instance to secure compatibility. Then the mixture was cooled to 160° C., at which temperature sulfur was added to each batch in the amounts shown below, and vulcanization was carried out at 160° C. Films made from the respective finished products were air-dried at room temperature, with results as indicated.

TABLE 3A

| Time of treatment | ½% sulfur | 1% sulfur | 3% sulfur |
|---|---|---|---|
| After sulfur addition | 2 hrs. 10 min. | 1 hr. 30 min. | 20 min. |
| Gardner viscosity in mineral spirits (50% solids) | C— | D | G. |
| Drying time (dust free) | 2 hours | 3 hours | 2 hours. |
| State of film:[1] | | | |
| (A) After 7 hours | F | G | H. |
| (B) After overnight drying | D | F | G. |

[1] State of film—evaluated according to the following standards, from the Official Digest of the Federation of Paint & Varnish Production Clubs, No. 221, Dec. 1942:

| Film condition or through-drying | Print condition (finger print) |
|---|---|
| I—Wet to tacky | D—Dry, definite print but tack-free |
| H—Very tacky | C—Dry, slight print |
| G—Tacky | B—Dry, very faint print |
| F—Slight tack | A—Dry, print free |
| E—Very faint tack | |

All films were deposited with a Bird film applicator to yield .0015″ wet film thickness.

Observations: It will be seen that a higher viscosity was attained with 3% sulfur in twenty minutes than with ½% sulfur in two hours and 10 minutes.

SET D

*Variations of cooking techniques*

Three methods of making an oleo-resinous varnish cook with a low percentage addition of sulfur were compared.

A. The oil was heated with sulfur until it gelled completely, and was then cooked with a resin to produce a varnish.

B. The oil was heated with sulfur to produce a heavy-bodied vulcanized oil, short of gelation, and the resin was thereafter added to this oil and the mixture cooked further.

C. The bodied oil and resin were mixed, and sulfur added to the mixture, which was then cooked.

With each method, approximately 25 gallon long varnishes were prepared, in one series with (a) an ester gum, in another series with (b) lime hardened rosin.

The oil used in this comparative set was an SO₂ oil of the type of IIa, but at a viscosity of Z-5 on the Gardner scale.

Results of these examples are given in Table 4, below.

TABLE 4

| | Method A | Method B | Method C |
|---|---|---|---|
| Per cent sulfur | 1¼ | 1¼ | 1¼. |
| Vulcanizing time of oil | 35 min. to gel | 20 min. | None. |
| Vulcanizing temperature of oil | 160° C | 160° C | Do. |
| Varnish cooking time | 30 min | 30 min | 30 min.[1] |
| Varnish cooking temperature | 200° C | 200° C | 200° C. |
| Gardner viscosity (at 50% solids in mineral spirits): | | | |
| (a) With ester gum | F | F | F. |
| (b) With lime-hardened rosin | M | G | G. |

[1] Oil and resin mixed, and sulfur added at 160° C.

The completely vulcanized oil of Method A reliquefied on heating with the resin. With this type of varnish cooking, it is advisable to pre-melt the resin before admixing it with the gelled oil.

The final viscosities of the varnishes were similar under the conditions applied regardless of the method of cooking employed.

Comparative drying tests of the films produced from all six of the finished products here considered established that good drying properties may be secured. In effecting these drying tests, four series were run, one of which used the material alone without driers, and the others the material with each of three drier combinations. These drier combinations were:

(1) 0.02% manganese, 0.03% cobalt, and 0.3% lead
(2) 0.15% zinc and 0.2% calcium
(3) 0.15% zinc and 0.2% calcium and 0.03% manganese (The driers were added as naphthenates and the percentage figures given above are in terms of metal content, based on the oil present.)

The tests showed that driers can be used to advantage, but that those containing only metals which react to produce light-colored sulfides are not as effective as those containing cobalt and lead. Nevertheless, even with driers capable of producing dark sulfides, the products were of good color in view of the low percentage of sulfur employed. The best of these drier combinations was (1) containing manganese, cobalt and lead. Drier combination (3) containing zinc, calcium and manganese, was best when used with the product of Method B–b, that is, with a varnish made by mixing lime hardened rosin with a pre-vulcanized SO₂ oil and cooking the mixture.

Other tests made on the films produced from these several varnishes showed very good hot water resistance. The alkali resistance of the ester gum varnish films, 48 hours old, was especially satisfactory, since it required 5 to 6 hours immersion in a 3% NaOH solution to turn the films milky, and they did not shown much further change even after overnight immersion. The films made from the ester gum varnishes showed better alkali resistance than those made from the lime hardened rosin varnishes.

SET E

*Accelerators and driers*

The varnish base used throughout this series was one made from a mixture of an $SO_2$ oil, of type IIa ($SO_2$ bubbled through oil at rate of 22 gm. per hour to 8000 gms. of oil, and bodied to a viscosity of 800 poises), and a rosin-modified maleic resin known as Amberol 801. It was approximately a 25 gallon long varnish.

This varnish was made by slowly heating 150 parts of Amberol 801 and 75 parts of the oil to 300° C. Thereupon 225 more parts of $SO_2$ oil were added and the mixture re-heated to 300° C. (This procedure was necessary to effect compatability of the oil and the resin.) Then, after the temperature had dropped to 160° C., 4½ parts (1½%, based on the oil content) of sulfur were added, and this temperature was held at 160° C. for 5 minutes. The varnish base was then thinned with mineral spirits to 66.6% non-volatile content.

To portions of this varnish various accelerators were added in the form of pastes in the proportion of ½% of accelerator, (based on the oil content). The accelerators were ground on a paint mill with a small portion of the varnish, to produce the paste used.

A number of tests were run, adding various accelerators and/or auxiliary agents and combinations of such agents to the varnish, to observe the effect of such additions in promoting drying of the varnish films.

Six sets of tests were carried out, using varying combinations of varnish with one or more of various addition agents, namely:

1. Varnish plus driers   Zinc oxide   Accelerators
2. Varnish plus driers   Zinc oxide   ----------
3. Varnish plus driers   ----------   Accelerators
4. Varnish plus driers   ----------   ----------
5. Varnish plus ------   ----------   Accelerators
6. Varnish plus ------   Zinc oxide   Accelerators In those cases where accelerators were used, Tuads, butyl zimate, and DOTG were tested. Where driers were used, 0.9% lead and 0.1% cobalt were employed (metal content based on the oil present). The zinc oxide was added in the form of a paste, ground in the varnish.

Comparing the six sets with each other, it is pointed out that the first set—using driers, zinc oxide and accelerators—is the best. The results of the first set are closely followed by the second set in which case driers and zinc oxide are used in the absence of accelerators. The next best set is number 3, using driers and accelerators, and this is followed by sets 4, 5 and 6, respectively.

Comparing the individual accelerators with each other, DOTG (diorthotolylguanidine) is the best of the five Tuads (tetraethylthiuram disulfide) and butyl zimate are next in effectiveness. When two other accelerators, namely, Captax (mercaptobenzthiazole) and ethyl zimate were used, the drying at room temperatures was somewhat retarded. It may be mentioned that the several accelerators displayed the same effectiveness, relative to each other, in all four sets in which they were utilized.

It should first be remembered that this group of tests was run to establish the effect of the presence of various auxiliary agents as hastening the drying of the film, under air drying conditions. Accelerators, as noted ante, are useful for other reasons; and their effect on air drying at room temperature (under the conditions of these tests) is different from their action as respects a surface coating which is dried by baking.

The results of these tests emphasize the importance of driers in making air-drying varnishes according to my invention with low-percent sulfur content. They also indicate the desirability of the conjoint use of all three types of auxiliary agents (driers, zinc oxide and accelerators), and the rather surprisingly good drying qualities of driers plus zinc oxide. It may be added that the second series gave faster drying films than any combination containing Captax or ethyl zimate. Further, DOTG was found to be a very satisfactory accelerator, when making air-drying varnishes.

Another series of comparative examples is offered here, showing the results of adding accelerators and auxiliary agents at different stages in the preparation of the varnish. In this group, driers comprising 0.9% lead and 0.1% cobalt were used along with the accelerators, and the auxiliary agents were added at the following stages:

1. Added to the bodied-oil plus resin mixture along with the sulfur, before the vulcanizing step.
2. Stirred into the varnish base in the kettle, after cooking and just before thinning.
3. Ground into the completed varnish, before it was used.

Of the various accelerators, DOTG was again the best. Zinc oxide was used in place of accelerators in one group, and it was almost as good as the best accelerators of this series. The action of accelerators was improved by adding zinc oxide.

Adding the accelerators to the varnish base either before vulcanizing or before thinning proved to give better results than adding them to the completed varnish.

SET F

*Coatings for baking*

The following examples show that coatings well suited to baking may be prepared in accordance with this invention. In four of these examples a varnish base was formulated with bodied linseed oil and ester gum, vulcanized with 1½% sulfur, based on the oil. In two other examples, the resin component was Amberol 801 (a maleic resin) instead of ester gum, these two also being vulcanized with 1½% sulfur. The linseed oil used was, in one instance, a heat-bodied oil of type III above, in all other instances it was $SO_2$ bodied oil of type II. In each instance the varnish bases were of approximately 25 gallon length.

The films produced from these various combinations of varnish plus the auxiliary agents mentioned below were tested after baking for half an hour and after baking for 1 hour, at each of two baking temperatures. The results are given in Table 5, below.

The letters under each of the four baking temperature headings indicate film condition according to the standards referred to above. In this method A represents the driest film obtainable.

Naphthenate driers were used in each example (the driers being dissolved in mineral spirits), in a proportion to yield 0.9% lead and 0.1% cobalt as metal, based on the oil content in Examples 1, 2 and 5 in Table 5. In the case of Examples 3 and 4, 0.3% lead, 0.03% cobalt and 0.02% manganese was the proportion of the drier combination, as metal based on the coil content. Example 6 did not have any driers.

TABLE 5

| Ex. No. | Oil | Combination tested | | State of film after baking at— | | | |
|---|---|---|---|---|---|---|---|
| | | Varnish base resin | Auxiliary agent | 120° C. for— | | 140° C. for— | |
| | | | | ½ hour | 1 hour | ½ hour | 1 hour |
| 1 | II | Ester gum | Driers+butyl-eight | H | E | G | D− |
| 2 | II | do | Driers+zinc oxide | G | G | G | D− |
| 3 | III | do | Driers | H | F | A | A |
| 4 | II | do | do | G | G | H | D− |
| 5 | II | Amberol 801 | Driers+zinc oxide | E | E | E | A |
| 6 | II | do | Zinc oxide, no driers | H | D− | F | D− |

Observations: The above table shows that at 120° C. baking temperature, in most cases, a baking time of at least 1 hour is desirable. At 140° C., however, one hour bake yields very satisfactory results and in case of Example 3 even ½ hour bake gave a very good film.

In addition, the films produced from the vulcanized base of my invention also have the other improved qualities, such as greater elasticity, longer life and the capacity of yielding good results when applied "wet-on-wet."

SET G

*Use of different oils*

The adaptability and scope of my process is well illustrated by the examples given below, in which the results following employment of several different oils are compared. In all examples of this Set, the oleo-resinous varnish base employed was approximately of 25 gallon length; that is, having an oil:resin ratio of 2:1 by weight. The thinner used in each case was mineral spirits.

In the following table (Table 6) are compared the results of treatment according to my invention, as applied to two drying oils and a semi-drying oil, using, in each instance, 1½% sulfur and, as drier combination, 0.3% lead, 0.03% cobalt and 0.02% manganese, the proportions being calculated as percentages of the oil present.

non-drying oil, which was bodied by blowing with air to a viscosity of Z–6+. The bodied oil was mixed with ester gum and heated to 270° C. Then the temperature was dropped to 160° C. at which point 1½% sulfur, based on the oil content, was added.

TABLE 7

Cooking temperature with sulfur_____° C__ 160
Time at cooking temp_____min__ 15
Viscosity (50% solids) _____ A
Drying time (dust free) _____hours__ 4
State of film:
   (A) After 7 hours _____ H
   (B) After overnight drying_____ H

SET H

*Coating "wet-on-wet"*

The following examples illustrate the non-lifting character of varnishes made with a low-percentage of sulfur in accordance with my invention. Two varnishes were used in these examples, both of them being 25 gallon long varnishes made from an $SO_2$ oil similar to type IIa. One varnish, however, was made with Arochem 260 (a modified phenolic resin), and the other used ester gum as the resin constituent. Both of the varnishes were vulcanized with 1½% sulfur.

With the varnish base incorporating Arochem 260, the drier combination used was one affording the following percentages of metal based on

TABLE 6

| | Heavy bodied linseed oil viscosity Z–3 to Z–4 [1] | Dehydrated castor oil "Isoline" viscosity Z–3 [2] | Solidified soya bean oil [3] |
|---|---|---|---|
| Resin used | Paranol 1750 | Ester gum B | Ester gum B. |
| Temperature: | | | |
|   (A) At time of sulfur addition | 160° C | 140° C | 140° C. |
|   (B) During cooking | 160° C | 160° C | 160° C. |
| Time of cooking | 30 min | 15 min | 15 min. |
| Gardner viscosity in mineral spirits (50% solids) | C | A | C. |
| Drying time of film (dust free) | 3 hours | 3 hours | Not tested. |
| State of film (by scale above): | | | |
|   (A) After 7 hours | G | G | Do. |
|   (B) After overnight drying | F | F | Do. |

[1] Paranol 1750 (a rosin modified phenolic resin) was mixed with the linseed oil in the following way to attain compatibility. The resin and half of the oil were heated together to 270° C., then the remaining oil was added, and the resultant mixture was re-heated to 270° C. Following this the mixture was allowed to cool to 160° C., at which point the sulfur was added.

[2] The Isoline (a commercially available dehydrated castor oil) was bodied, in this case by heat, to a viscosity of Z–3. No special treatment was needed to secure compatibility. The oil and resin were simply mixed and heated.

[3] To make the solidified soya bean oil, the oil was bodied by bubbling with $SO_2$ (20 grams per hour for 8000 grams of oil) at 300° C. for 5 hours at 100 mm. mercury pressure. This was followed by the addition of 1.33% NaOH (at 250° C.) and further treatment, as disclosed in my copending application Serial No. 439,513, filed April 18, 1942, wherein the method of bodying fatty oils with $SO_2$ is considered in detail. The result of the treatment was, at room temperature, a solidified product, reversibly fusible and thermoplastic. The solidified oil was melted with the ester gum, and sulfur added.

With reference to the drying test at the end of the preceding table, it will be noted that the films tested were produced by using a Bird applicator (.0015″) to lay a uniform coat of varnish on glass panels.

Still another oil was used, namely, corn oil, a the oil content of the base: 1.8% lead, 0.2% cobalt, and 0.5% zinc. The drier combination used with the other varnish base was of the type identified as (1) in Set D, that is, one providing 0.3% lead, 0.03% cobalt, and 0.02% manganese, based on the oil content.

As in various drying tests noted above, films were first produced with an .0015" Bird film applicator on glass panels followed by a second coat with a .003" Bird film applicator. On each of five panels a first coat was made with the thinner knife. After one-half hour a second coat was applied to the lower half of the first panel with the heavier knife thereby producing a second wet film of about .0015" or a total wet film thickness of .003". At the end of one hour a second coat was applied in a similar way to the lower half of the second panel. The lower halves of the remaining panels received a second coat at 2 hours, 3½ hours and 5 hours respectively from the time of the first strike-off. The results of the test indicated that under the condition of the test the first coat would not be lifted by the application of the second coat even where the drying time of the first coat was as short as half an hour. In every case the films were perfect, even after the second coat had been applied.

SET I.—AQUEOUS EMULSION COATINGS

As noted above, emulsion coatings made from varnish bases containing low-sulfur content vulcanized oils have many desirable properties. A few examples to demonstrate the preparation of such emulsions are offered here. By proper selection of the emulsifying agents and control of other factors, it is possible to produce from the products of my invention emulsions of the water-in-oil type as well as emulsion of the oil-in-water type. In either case, the resultant emulsion coatings manifest the light color typical of the vulcanized materials of this invention as well as other desirable characteristics, such as good aging properties, elasticity and the like.

In the four examples given below, the same drier combination was used, but in different proportions. This drier combination was prepared according to the following formula:

*Drier combination*

Naphthenate driers containing:

|  | Cc. |
|---|---|
| (a) 24% lead | 34.9 |
| (b) 6% cobalt | 17.0 |
| (c) 6% manganese | 11.3 |
| Mineral spirits added | 63.2 |
| Total mixture | 126.4 |

It will be noted that this drier combination incorporates the same metals as were used in forming the drier combination identified as (1) in Set D above.

*Water-in-oil emulsions*

Example 1.—A maleic type varnish base was prepared using 500 parts of heavily bodied SO₂ oil (Type IIa) to 500 parts of Amberol 801, a rosin-modified maleic resin. Compatibility with the oil and resin was secured by heating the latter with 200 parts of the oil to 300° C., then slowly adding the rest of the oil, and holding the temperature at 300° C. until the mixture was clear. Then the temperature was dropped to 160° C. 7½ grams of sulfur (about 1½% based on the oil content) were added and the temperature was held at 160° C. for 5 minutes thereafter.

To 50 grams of the varnish base, prepared as stated above, were added 50 grams of mineral spirits and .46 cc. of the drier solution, ante. The resultant material was mixed with 51 cc. of a 2% aqueous solution of methyl cellulose and 100 cc. of water, an agitator being used. The result was a water-in-oil emulsion, readily dilutable with mineral spirits, which produced a glossy film having suitable drying properties in overnight air drying.

Example 2.—The varnish base used in this example was also 12½ gallon length but instead of the maleic resin used in preparing the varnish base of Example 1, the resin constituent for the present example was ester gum base. No special precautions were needed to establish compatibility. The resin and the heavily bodied SO₂ oil were simply mixed with heating, and at a temperature of 160° C., 1½% sulfur (7.5 grams) was added to the batch, which was then cooked at 160° C. for 10 minutes, with agitation. As in the preceding example 50 grams of this varnish base material was diluted with 50 grams of mineral spirits and .46 cc. of the drier combination noted above was incorporated in the mixture. This mixture was worked on a paint mill with 51 cc. of a 2% aqueous solution of methyl cellulose and 10 cc. of water. The result was a water-in-oil emulsion, readily dilutable with mineral spirits. This emulsion produced a glossy film showing satisfactory drying qualities in overnight air drying.

*Oil-in-water emulsions*

Example 3.—An ester gum varnish base was prepared, of approximately 25 gallon length, using 333 parts of ester gum and 667 parts of heavily bodied SO₂ oil of type II. The oil and resin were mixed with heating to 160° C., and at this temperature 10 parts of sulfur (1½% of the oil present) added. Following the sulfur addition, the mixture was cooked for 10 minutes at 160° C. To 100 grams of the varnish base so formed, 1.23 cc. of the drier combination noted above were added and this material was used in the preparation of an oil-in-water emulsion. The emulsion was constituted by mixing the material stated with 16 cc. of a 10% sodium hydroxide solution and 52 cc. of a 2% aqueous solution of methyl cellulose, together with 36 cc. of distilled water. The mixing was continued until complete dispersion resulted. The result was the production of an oil-in-water emulsion which was readily dilutable with water and which produced a film of satisfactory properties.

Example 4.—An emulsion was formulated in accordance with the procedure of Example 3 except that: in lieu of 16 grams of sodium hydroxide, 5 grams of sodium stearate were used; and more water was used, namely 50 cc. instead of 36 cc. Here again the result was the production of an oil-in-water type emulsion which was readily dilutable with water and which produced a film having satisfactory qualities after overnight drying.

It should be borne in mind that whatever drier combination is used, preferably the driers should be added to the varnish base before any steps are taken toward emulsifying the material.

The four preceding examples are intended merely to demonstrate that the low-sulfur content vulcanized varnish base materials of my invention lend themselves readily to use in the form of aqueous emulsions. It should be emphasized again that these bases retain their distinctive qualities (elasticity, water resistance, light color, etc.) even in emulsified form, and also have other properties not ordinarily found in emulsions, such as the ability to form glossy films, and to cover porous surfaces without excessive penetration. Further the water-in-oil emulsions, made according to this process, have the ability to "wet-out" non-porous surfaces.

This specification is a continuation-in-part of my application Serial Number 486,849 filed May 13, 1943.

What I claim is:

1. In the preparation of varnish bases, the process which comprises: bodying a varnish base material comprising a fatty oil to a viscosity such that it will vulcanize to an irreversible gel upon being heated at 160° C. with 4.5% sulfur in less than four hours, but not beyond the point at which an irreversible gel would be formed in less than 15 minutes on heating at 120° C. with 0.5% of sulfur, and not beyond the point at which the oil will cease to manifest flow characteristics at room temperature, and thereafter vulcanizing said fatty oil at a temperature between 100° C. and 200° C. with from a trace to 4.5% of sulfur, the vulcanization at the said temperature being terminated prior to the formation of an irreversible gel.

2. The process of claim 1, in which the varnish base material comprises a fatty oil and a resin.

3. The process of claim 1, in which the varnish base material is an oil-resin mixture and in which the addition of sulfur occurs prior to the addition of the resin component of the varnish base material.

4. The process of claim 1, in which the varnish base material is an oil-resin mixture and in which the addition of the sulfur occurs after the oil and the resin have been blended.

5. In the preparation of varnish bases, the process which comprises: bodying a fatty oil to a Gardner viscosity greater than X, but not so great that the oil will cease to manifest flow characteristics at room temperature; and then preparing a varnish base by admixing the bodied oil with a resin and cooking the mixture in the presence of sulfur from ½% to about 9% of the oil, at a temperature above 100° C. and below 200° C. for a time sufficient to produce a viscosity of A on the Gardner scale, when thinned to 50% non-volatile content with mineral spirits, but not sufficient to produce an irreversible gel.

6. The process of claim 5, in which the fatty oil is bodied to a viscosity between 500 and 800 poises prior to the sulfur treatment.

7. A sulfur treated, chlorine free, soap-free, varnish base comprising a partially vulcanized bodied fatty oil and containing not more than about 9% of sulfur of vulcanization in relation to the amount of oil present, said bodied fatty oil having a viscosity of at least Y on the Gardner scale.

8. A coating material containing a soap-free bodied and sulfur treated partially vulcanized fatty oil of the class which consists of drying and semi-drying oils, which material contains not more than 9% sulfur of vulcanization based on the oil content, said bodied fatty oil having a viscosity of at least Y on the Gardner scale.

9. A coating material containing a soap-free bodied and sulfur treated partially vulcanized fatty oil of the class which consists of drying and semi-drying oils, which material contains not more than 4½% sulfur of vulcanization based on the oil content, said bodied fatty oil having a viscosity of at least Y on the Gardner scale.

10. A coating material containing a soap-free bodied and sulfur treated partially vulcanized fatty oil of the class which consists of drying and semi-drying oils, which material contains not more than 3% sulfur of vulcanization based on the oil content, said bodied fatty oil having a viscosity of at least Y on the Gardner scale.

11. A surface coating composition comprising a partially vulcanized bodied oil and resin blend containing upwards of ½% but not over 4.5% of sulfur of vulcanization based on the oil content, said coating composition incorporating a metallic pigment and a metal-containing drier, the composition being characterized by the ability to retain its color without substantial darkening, said bodied fatty oil having a viscosity of at least Y on the Gardner scale.

12. A coating composition comprising a partially vulcanized bodied soap-free oil containing from 0.5% to 4.5% sulfur of vulcanization and a metallic drier, said composition having a light color, being characterized by its ability to retain lightness of color notwithstanding the presence of the metallic components of the drier, said bodied fatty oil having a viscosity of at least Y on the Gardner scale.

13. A process for producing a surface coating material which comprises the steps of bodying a fatty oil at a temperature above 200° C. until it has attained a viscosity of from about 500 to about 800 poises; admixing the bodied oil with a resin; reducing the temperature of the mixture to less than 200° C.; adding 1½% of sulfur, calculated with respect to the oil content, to the mixture, cooking the mixture at less than 200° C. to effect vulcanization and to establish a viscosity of at least A on the Gardner scale when thinned to 50% non-volatile content with mineral spirits, and then stopping the cooking and the vulcanizing by cutting off the heat and adding a volatile solvent directly to the batch.

14. In the manufacture of surface coating compositions, the process which comprises (a) the preparation of a base material by incorporating with a resin a soap-free fatty oil pre-bodied to such an extent that, upon being incorporated with the resin, a mixture will be produced of such viscosity that, upon being heated with 4½% of sulfur based on the oil content at 160° C., it will vulcanize to an irreversible gel in less than four hours, but not of so great a viscosity that it will vulcanize to an irreversible gel upon being heated with ½% sulfur based on the oil content at 120° C. in less than fifteen minutes; and (b) cooking said base material in the presence of from ½% to about 9% of sulfur, based on the oil content, at between 100° C. and 200° C., until a partially vulcanized varnish base has been produced.

15. In the manufacture of surface coating compositions, the process which includes the vulcanization of a varnish base comprising a bodied fatty oil in the presence of from ½% to about 9% of sulfur based on the amount of oil present, in a temperature range from 100° C. to about 200° C., which process is characterized by the use of a soap-free fatty oil having a Gardner viscosity, prior to vulcanization, at least as great as Y, said vulcanization being terminated prior to the formation of an irreversible gel.

16. The process of claim 15, in which the amount of sulfur employed is from 1% to 1½% of the oil.

17. In the manufacture of a varnish base, the process which includes the steps of vulcanizing a soap-free bodied fatty oil having a viscosity over 15 poises with from 0.5% to about 9% of sulfur for a time not exceeding four hours and at a heat vulcanizing temperature not exceeding 200° C., until gelation occurs; adding the gelled oil to resin with the application of sufficient heat to reliquefy the gelled oil; and cooking the resultant blend until a desired consistency in the varnish-base range has been attained, said cooking of the blend being terminated prior to the formation of an irreversible gel.

18. In the preparation of fatty oils for use in coating compositions, the process which comprises bodying the fatty oil to a viscosity of at least 100 poises, but not so great a viscosity as to destroy its capacity to manifest flow characteristics at room temperature, mixing the bodied oil with from ½% to 4.5% sulfur, and heating the mixture at a temperature of from 120° C. to 200° C., until a partially vulcanized bodied oil is obtained.

19. A surface coating composition comprising a soap-free partially vulcanized bodied fatty oil, and having the following general formula:

| | Parts |
|---|---|
| Fatty oil | 100 |
| Resin | 12½ to 300 |
| Sulfur of vulcanization | 0.5 to 9 |
| Metallic driers with a metallic content of | 0.2 to 4 |
| Vulcanization accelerators | Not more than 2 |
| Zinc oxide | At least 1 | in which the fatty oil is one selected from the class of heavy bodied oils having a viscosity prior to incorporation in the composition of at least 15 poises, said fatty oil having at least semi-drying properties.

20. The composition of claim 19 in which the vulcanization accelerator is diorthotolylguanidine.

21. A surface coating composition comprising a soap-free partially vulcanized bodied fatty oil, and having the following general formula:

| | Parts |
|---|---|
| Fatty oil | 100 |
| Resin | 12½ to 300 |
| Sulfur of vulcanization | 0.5 to 9 |
| Metallic driers with a metallic content of | 0.2 to 4 |
| Vulcanization accelerators | 0 to 2 |
| Zinc oxide | 0 to 1 | in which the fatty oil has at least semi-drying properties and is one selected from the class of heavy bodied oils having a viscosity prior to incorporation in the composition of at least 100 poises.

22. An oil-in-water emulsion incorporating the product of claim 11 with an emulsifying agent and water.

23. A water-in-oil emulsion incorporating the product of claim 11 with an emulsifying agent and water.

24. An oil-in-water emulsion incorporating the product of claim 19 with an emulsifying agent and water.

25. In the manufacture of surface coating compositions, the process which comprises (a) the preparation of a base material by incorporating with a resin a fatty oil, and bodying the mixture to produce a viscosity such that, upon being heated with 4½% of sulfur based on the oil content at 160° C., it will vulcanize to an irreversible gel in less than four hours, but not of so great a viscosity that it will vulcanize to an irreversible gel upon being heated with ½% sulfur based on the oil content at 120° C. in elss than fifteen minutes; and (b) cooking said base material in the presence of from ½% to about 9% of sulfur based on the oil content at between 100° C. and 200° C. until a partially vulcanized varnish base has been produced.

LASZLO AUER.